No. 872,877. PATENTED DEC. 3, 1907.
Z. E. WILLIAMSON.
VEHICLE.
APPLICATION FILED MAY 9, 1907.
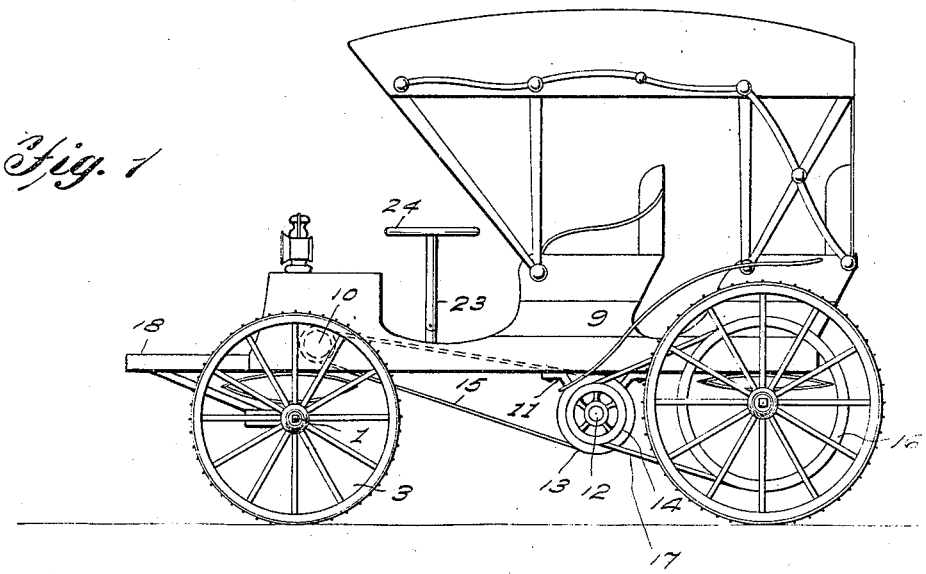
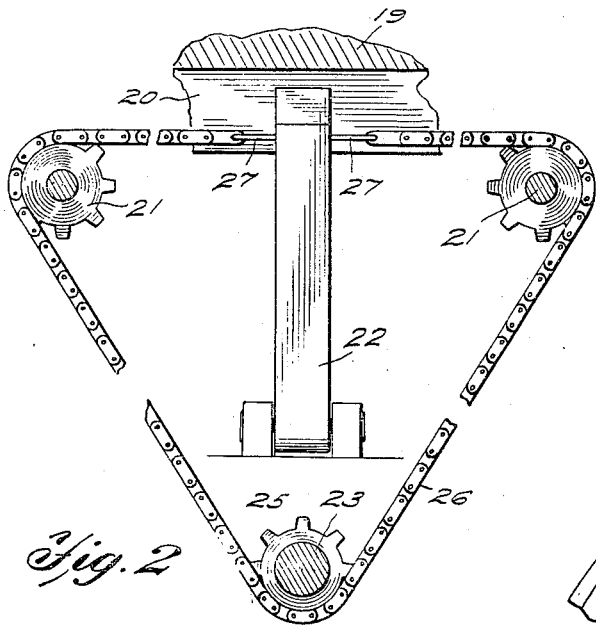
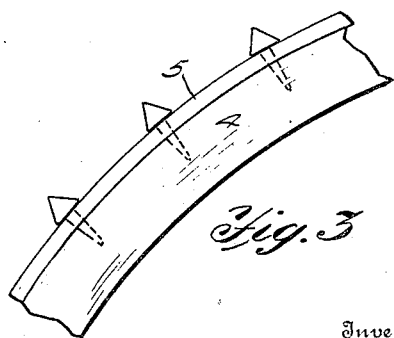
Inventor
Zephaniah E. Williamson
Witnesses
R. Claflin
J. W. Garner
By Victor J. Evans
Attorney

UNITED STATES PATENT OFFICE.

ZEPHANIAH E. WILLIAMSON, OF SHEFFIELD, ILLINOIS.

VEHICLE.

No. 872,877.  Specification of Letters Patent.  Patented Dec. 3, 1907.

Application filed May 9, 1907. Serial No. 372,693

*To all whom it may concern:*

Be it known that I, ZEPHANIAH E. WILLIAMSON, a citizen of the United States, residing at Sheffield, in the county of Bureau and State of Illinois, have invented new and useful Improvements in Vehicles, of which the following is a specification.

This invention is an improved automobile vehicle having improved means for propelling the same, improved means for guiding the same and wheels of improved construction to prevent them from slipping on ice, or on hard, soft or icy roads, and the same consists in the novel construction, combination and arrangement of devices hereinafter described and claimed.

In the accompanying drawing, Figure 1 is a side elevation of an automobile vehicle embodying my improvements. Fig. 2 is a detail horizontal sectional view of the steering gear for the front axle. Fig. 3 is a detail section of one of the wheels. Fig. 4 is a detail elevation of one of the wheel calks.

The vehicle shown in Fig. 1 is an ordinary road vehicle in which springs are placed between the axles and the body to support the latter and in which the front axle 1 turns on the usual pivot or king bolt. Each of the wheels 3 is provided with the usual solid felly or rim 4 and with the usual metallic tire 5. In accordance with my invention, I provide anti-slipping calks 6 for the wheels, each of which has a conical or pyramidal head 7 and a tapering stem 8. The latter is passed through an opening in the tire and is driven into the felly or rim to secure the calk on the periphery of the wheel with its head projecting from the tire thereof, as shown in Fig. 3.

The motor may be of any suitable construction and the same is located in the front end of the body 9 of the vehicle, its shaft being provided with a sprocket wheel, indicated in dotted lines, at 10. At a suitable distance from the front end of the body and journaled in suitable bearings 11 which depend from the vehicle body is a counter-shaft 12 which is provided at its center with a sprocket wheel 13 and at its ends with sprocket wheels 14 which are smaller than such wheel 13. An endless sprocket chain 15 connects the driving wheel 10 of the motor and the wheel 13 of the counter-shaft to drive such counter-shaft. Each of the rear wheels of the vehicle is provided on its inner side with a sprocket wheel 16 connected by an endless sprocket chain 17 to one of the wheels 14 of the counter-shaft. Said wheels 16 are larger than the wheels 14, as shown, to cause the rear wheels of the vehicle to rotate at lower speed than the counter-shaft.

It will be understood that my improved driving devices may be readily attached at comparatively small cost to an ordinary road vehicle to provide a thoroughly efficient and inexpensive automobile vehicle of any desired power and speed. The calks with which the wheels are provided prevent the wheels from slipping and give them great tractive power in propelling the vehicle. At the front end of the vehicle body 9 is a forwardly extending horizontal frame 18 at the front end of which is a transversely disposed guide bar 19, in the rear side of which is a guide-way 20. In opposite sides of the said frame 18 are direction sprocket wheels 21 which are suitably mounted. Pivotally connected to the front of axle 1 is a short tongue or tiller 22 which extends upwardly and forwardly from the said front axle and the front end of which is supported by and is disposed to travel on the guide-way 20 of the frame 18.

A steering shaft 23 is mounted in an upright position in the body of the vehicle at a suitable point, is provided at its upper end with a steering wheel 24, and to its lower end is secured a sprocket wheel 25 which engages and operates a steering sprocket chain 26 which also passes around the outer sides of the sprocket wheels 21 and has its ends attached, as at 27, to the front end of the tongue 22. It will be understood that by turning the wheel 24, the wheel 25 will cause the chain 26 to move in such manner as to move the tongue 22 in any desired direction to guide the vehicle.

Having thus described the invention, what I claim as new and desire to secure by Letters Patent is:—

A vehicle of the class described having a frame projecting from the front end of its body and provided with a transversely disposed guide-way, a tongue pivotally connected to an axle of the vehicle and bearing and disposed to travel in said guide-way, a steering shaft mounted in the body of the vehicle, having a steering wheel at its upper end and a sprocket wheel at its lower end, direction sprocket wheels mounted in the said frame at points at opposite sides thereof, and a sprocket chain engaging and connecting the sprocket wheels, the sprocket wheel at the lower end of the steering shaft and also connected to the tongue to move the latter in the guide-way, for the purpose set forth.

In testimony whereof, I affix my signature in presence of two witnesses.

ZEPHANIAH E. WILLIAMSON.

Witnesses:
MARVIN SKINNER,
CLARENCE NELSON.